Figure 1:
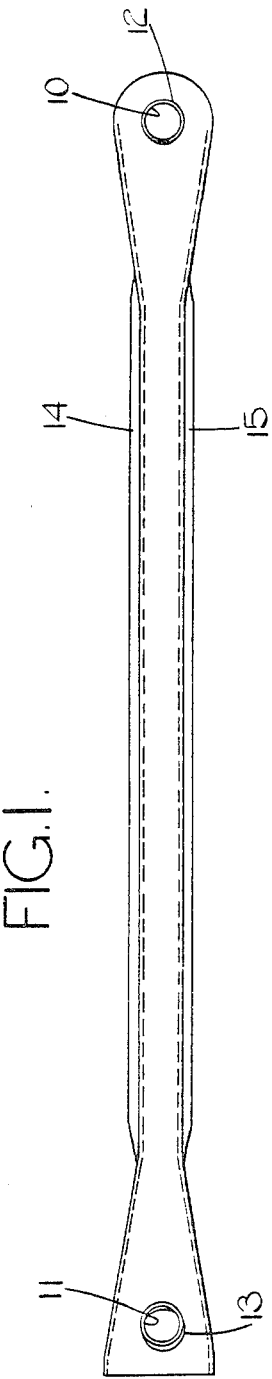

United States Patent [19]

Timmis

[11] Patent Number: 4,477,293
[45] Date of Patent: Oct. 16, 1984

[54] LINK AND WINDSCREEN WIPER MECHANISM

[75] Inventor: John P. Timmis, Sutton Coldfield, England

[73] Assignee: Lucas Industries Limited, Birmingham, Great Britain

[21] Appl. No.: 329,038

[22] Filed: Dec. 9, 1981

[30] Foreign Application Priority Data

Dec. 10, 1980 [GB] United Kingdom ................ 8039507

[51] Int. Cl.$^3$ ...................... C23C 11/16; F16C 11/05; B60K 1/18
[52] U.S. Cl. .................................... 148/31.5; 148/16; 148/16.6; 148/37; 74/42; 74/75
[58] Field of Search ....................... 148/16, 16.6, 31.5; 74/42, 75

[56] References Cited

U.S. PATENT DOCUMENTS

| | | | |
|---|---|---|---|
| 3,261,215 | 7/1966 | Simpson | 74/42 |
| 3,299,721 | 1/1967 | Ziegler | 74/75 |
| 4,003,764 | 1/1977 | Wunning | 148/16.6 |
| 4,047,981 | 9/1977 | Arnold et al. | 148/16.6 |
| 4,342,605 | 8/1982 | Watanabe | 148/16.6 |

FOREIGN PATENT DOCUMENTS

| | | |
|---|---|---|
| 854083 | 4/1977 | Belgium . |
| 1521425 | 1/1971 | Fed. Rep. of Germany . |
| 2053013 | 5/1971 | Fed. Rep. of Germany . |
| 2116463 | 10/1972 | Fed. Rep. of Germany . |
| 2333183 | 4/1974 | Fed. Rep. of Germany . |
| 1603037 | 4/1971 | France . |

OTHER PUBLICATIONS

Microtecnic, vol. 20, No. 3, 1966, pp. 300–304.
Microtecnic, vol. 20, No. 4, 1966, pp. 397–400.
Microtecnic, vol. 20, No. 5, 1966, pp. 492–493.
John C. Biheuce, Machine Design, vol. 46, No. 3, Feb. 7, 1974, pp. 117–121.

Primary Examiner—Veronica O'Keefe
Attorney, Agent, or Firm—Ladas & Parry

[57] ABSTRACT

An ultra lightweight, thin link for a windscreen wiper mechanism is formed of a strip which is of U-shaped section for most of its length and which has end portions in which integral bush bearings are provided by plunged holes in the strip. The strip is very thin, e.g. about 0.5 mm, and is formed of non-alloy steel having nitrogen diffused through substantially the whole of the section thereof.

The nitrogen is in solid solution in a ferritic matrix. Such a structure is obtained by heat treatment in a nitrogen containing atmosphere followed by oil quenching. The strip also has an epsilon iron nitride surface layer thereon in a portion 19b of which oil is absorbed to impart self lubricating properties to the bearings.

8 Claims, 5 Drawing Figures

LINK AND WINDSCREEN WIPER MECHANISM

This invention relates to a link for use in a motion transmitting mechanism and is particularly, but not exclusively, concerned with a link for use in a mechanism for wiping the windscreen of a road vehicle.

In a known windscreen wiper mechanism, one or more than one wiper arm and blade assembly, usually two assemblies, are each mounted on an individual spindle for oscillation by a common electric motor via a rotary driving crank, a link or set of links, and a driven crank on each spindle. The axes of the spindles are substantially parallel to each other and the link is sufficiently stiff to resist buckling forces transmitted by torque from the driving crank to the driven crank. With such a construction the link is provided at each end with a press-fitted plain bush bearing in which pivot posts associated with the spindles are respectively engaged. Such a windscreen wiper mechanism however is not suitable for use on automobiles where the axes of the spindles are not substantially parallel to each other. The link, which has to be relatively stiff to resist buckling forces and the plain bush bearings, do not provide sufficient flexibility to accomodate the misalignment of the spindle axes. This causes rapid wear of the bearing bushes with consequential noise and an inherent stiffness in the system which is obviously disadvantageous.

The above mentioned disadvantages can be partly overcome by providing a link having a ball joint at each end instead of a plain bush bearing. However, such a link tends to be expensive, and does not readily absorb shock loads.

A further disadvantage is that the above described links are of relatively heavy construction.

An object of the present invention is to obviate the above disadvantages by providing a link which is economical to manufacture and effective in operation, and which can be extremely thin and therefore extremely light.

According to the present invention, there is provided a link formed of a configurated strip of non-alloy steel, said strip having at least one integral bush bearing defined by part of the strip, and the non-alloy steel having nitrogen diffused through substantially the whole of the section of the strip, the nitrogen being in solid solution in a ferritic matrix.

Preferably, the steel contains up to 0.5% carbon.

For the link to be used as a link in a windscreen wiper mechanism, it is convenient for it to have a channel section (e.g. U-section) for most of its length and to have a substantially planar portion to facilitate elastic flexure under applied torsional loads. Such a link has two or more holes therein for defining two or more spaced bush bearings.

The use of plunged holes enables a much greater bearing area than plain holes drilled through the strip. It is to be appreciated that the strip will be very thin (e.g. 0.5 mm) to enable it to flex readily under applied torsional loads and to enable the nitrogen dispersed micro structure to be obtained in an economically advantageous processing time. Accordingly, the link will be extremely light in weight. However, it is to be appreciated that the precise thickness of the strip chosen will depend upon the use of the link.

Because the strip is very thin, it can be readily formed to the required cross-sectional shape so that a stiffness equivalent to that of thicker links can be imparted at the required regions whilst still permitting torsional flexure.

Advantageously, the solid solution of nitrogen in the ferritic matrix is one which has been produced by a gas phase heat treatment of the non-alloy steel.

Conveniently, the link has an epsilon iron nitride layer thereon and oil or other lubricant is absorbed into said layer at least in the region of the bearing surface(s) of said at least one plunged hole.

Such an epsilon iron nitride layer is produced during the gas phase heat treatment.

The oil or other lubricant is preferably provided by quenching the link after heat treatment in said oil or other lubricant.

The invention also resides in a wiper mechanism including at least one link according to the present invention.

Figure 2:
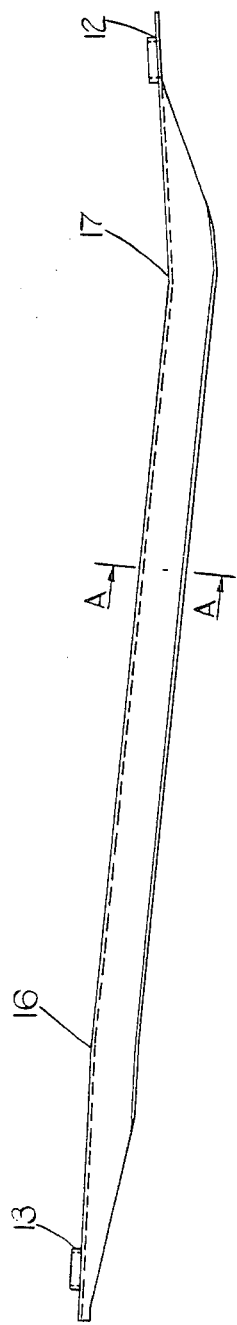
Figure 3:
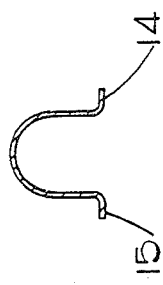
Figure 4:
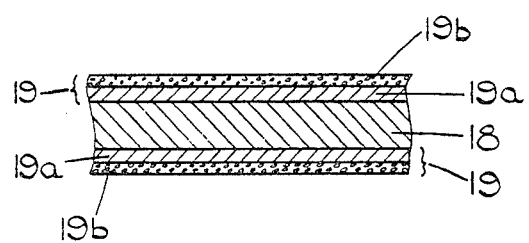
Figure 5:
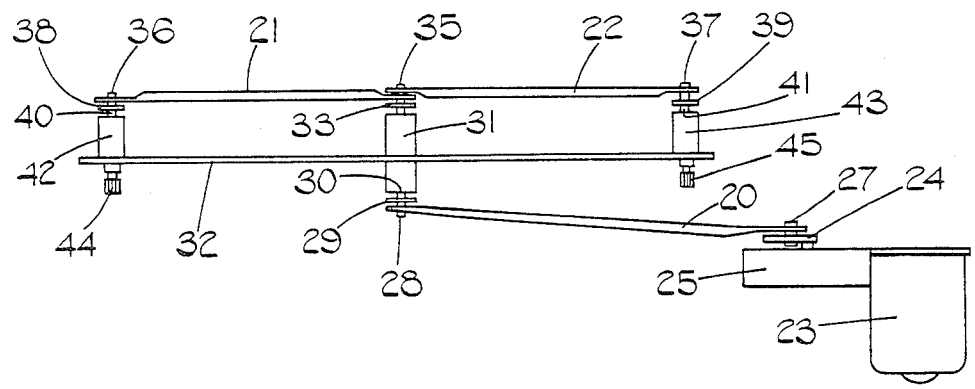

An embodiment of the present invention will now be described, by way of example, with reference to the accompanying drawing, in which:

FIG. 1 is a planned view of one embodiment of link according to the present invention, FIG. 2 is a side elevation of the link of FIG. 1, FIG. 3 is a section on the line A—A of FIG. 2, FIG. 4 is a schematic section view illustrating the structure of the link, and FIG. 5 is a schematic plan view of a windscreen wiper mechanism incorporating links according to the present invention.

The link illustrated in FIGS. 1 to 3 of the drawing is a link in a windscreen wiper operating mechanism and is intended to transmit motion from a windscreen wiper motor to a linkage which oscillates a pair of arms carrying wipers in a manner known per se, as will be described hereinafter with reference to FIG. 5. The link is formed of a configurated, 0.5 mm thick strip of non-alloy steel, in this embodiment, mild steel having a carbon content of 0.1 to 0.2%. The link has, at each end, a respective plunged hole 10, 11 to provide integral sleeves 12 and 13, respectively. The sleeves 12 and 13 form bearing bushes which are integral with the strip and which receive, in use, pivot posts attached to parts of the windscreen wiper mechanism which are required to be connected by the link. The strip is configurated so that over substantially the whole of its length intermediate the plunged holes 10 and 11, it is of U-shaped section (see FIG. 3) with outwardly directed integral flanges 14 and 15 extending from the arms of the U. The depth of the U-section is substantially constant for most of the length of the strip but, at each end, reduces in depth to such an extent that the strip is planar at the end thereof adjacent the sleeve 12. At its other end, the U-section has virtually disappeared and has changed from having a curved base to having a planar base. The strip is also longitudinally cranked in opposite directions at locations 16 and 17 so that the axes of the sleeves 12 and 13 are mutually inclined a slight angle of six degrees.

The strip has nitrogen diffused through substantially the whole of the section thereof, the nitrogen being in solid solution in a ferritic matrix. The strip also has an epsilon nitride surface layer having a depth of 10 to 18 $\mu$m.

The above described link is produced by press-forming a 0.5 mm thick sheet of mild steel having a carbon content of 0.1 to 0.2% into the above described configuration. At this time, the plunged holes are also formed in the strip. Following this, the strip is heat treated in furnace at 570° C. for 2 hours in an atmosphere consisting of ammonia and an endothermic gas mixture (carbon monoxide, carbondioxide, nitrogen and hydrogen). During heat treatment, the residual level of ammonia was maintained at about 42% and 5 volume changes per hour were effected. Furnace treatment of the strip also resulted in the above mentioned epsilon nitride surface layer. Immediately after treatment, the link was oil quenched to ensure that the nitrogen which had diffused into the body during treatment remained in solid solution in the ferritic matrix. As a result of the oil quenching, oil was retained within pores in the epsilon nitride surface layer. Referring now to FIG. 4, the link section has a core portion 18 consisting of a ferritic matrix in which nitrogen is in solid solution and a surface layer 19 at each side thereof. Each surface layer 19 is of epsilon iron nitride, is hard, and is composed of an inner layer portion 19a and an outer layer portion 19b. The inner layer portion 19a is substantially non-porous whilst the outer layer portion 19b is relatively porous and contains the oil introduced as a result of the above-mentioned quenching operation.

Because of the thin section of the link, the nitrogen is diffused throughout substantially the whole of the section.

Instead of employing the above-described gaseous heat treatment, the link may be heat treated in a salt bath to effect the nitrogen diffusion and to produce the epsilon iron nitride layer 19.

The resultant link material has a very high yield strength and the shape of the link gives good axial compression properties. A thick link section would not lead to a material improvement in the already high yield strength. In addition, the strip is readily able to twist torsionally and so is easily capable of accommodating any reasonable axial misalignment of the pivot posts with which it is engaged, in use, as will be described hereinafter. Furthermore, the link has a high fatigue resistance and is capable of withstanding many torsional twisting cycles without breaking, and of absorbing shock loads due to its resilient nature.

As a result of the heat treatment and oil quenching the link is resistant to corrosion in use and the integral bearing bushes are self lubricating as a result of the existence of oil in the pores of the epsilon nitride surface layer internally of the sleeves 12 and 13.

Referring now to FIG. 5, the windscreen wiper mechanism includes three links 20, 21 and 22 according to the present invention. The link 20 is the link described above with reference to FIGS. 1 to 4 and the other links 21 and 22 are similarly produced. The wiper mechanism comprises an electric motor 23 driving a first crank 24 via a reduction gearbox 25. The link 20 is pivotally attached at one of its ends to a pivot post 27 of the first crank 24. The opposite end of the link 20 is pivotally connected to a pivot post 28 of a second crank 29. The second crank 29 is secured on a shaft 30 rotably mounted in a bush 31 secured to a support 32 which may form part of a bulkhead of a motor vehicle in which the mechanism is fitted. At the opposite end of the bush 31 to the second crank 29, a third crank 33 is secured on the shaft 30. The third crank 34 has a pivot pin 35 upon which one end of each of the links 21 and 22 are pivotally mounted. The opposite ends of the links 21 and 22 pivotally mounted on respective pivot posts 36 and 37 of fourth and fifth cranks 38 and 39. The fourth and fifth cranks 38 and 39 are secured to respective rotary shafts 40 and 41 rotatably mounted in bushes 42 and 43 secured to the support 32. The shafts 40 and 41 have splined portions 44 and 45 thereon. An assembly (not shown) of wiper blade and wiper arm is mounted on each splined portion 44 and 45 in a manner known per se. Rotation of the electric motor 23 effects rotation of the first crank 24 to reciprocate the link 20 which in turn causes oscillation of the second crank 29 and thus oscillation of the third crank 33. Oscillation of the third crank 33 causes reciprocation of the links 21 and 22 and thereby oscillation of the fourth and fifth cranks 38 and 39 whereby the wiper blade and arm assemblies are oscillated.

In the above described embodiment, we have described a link suitable as a link for a windscreen wiper mechanism. However, it is to be appreciated that the present invention is applicable to any motion transmitting mechanism where the circumstances are such that, in use, torsional and/or bending loads are applied to the link either by design or as a result of unavoidable assembly inaccuracies.

In a further embodiment the link has at least one bearing bush which is formed by providing in the strip a hole having a serrated periphery, and bending the serrations in the strip. For example, a part-spherical socket type of bearing bush for engagement by a ball member in the manner of a ball-and-socket joint, may be produced by bending alternate serrations in one direction out of the general plane of the strip and the remaining serrations in the opposite direction out of the general plane of the strip.

I claim:

1. A link formed of a configured strip of non-alloy steel having nitrogen diffused through substantially the whole of the section of the strip, the nitrogen being in solid solution in a ferritic matrix, and the strip having at least one integral bush bearing defined by part of the strip.

2. The link according to claim 1, wherein the non-alloy steel contains up to 0.5% carbon.

3. The link according to claim 1, having a channel section for most of its length and at least one substantially planar portion.

4. The link according to claim 1, having an epsilon iron nitride layer thereon.

5. The link according to claim 1, wherein the surface of the link, at least in the region of a bearing surface of said at least one plunged hole, containing a lubricant.

6. The link according to claim 5, wherein substantially the whole of the surface of the link contains a lubricant.

7. The link according to claim 6, wherein said lubricant is present as a result of quenching of the link in lubricant after heat treatment to produce the ferritic matrix diffused with nitrogen.

8. A windscreen wiper mechanism comprising a motor, mounting means for at least one wiper blade and arm assembly, and a transmission, including at least one link and pivot means upon which said at least one link is mounted, for effecting oscillation of the mounting means upon operation of the motor, said link being formed of a configured strip of non-alloy steel having nitrogen diffused through substantially the whole of the section of the strip, the nitrogen being in solid solution in a ferritic matrix, and the strip having at least one integral bush bearing defined by part of the strip.

* * * * *